United States Patent
Dickens et al.

(10) Patent No.: US 8,954,768 B2
(45) Date of Patent: Feb. 10, 2015

(54) STORAGE SYSTEM POWER MANAGEMENT

(75) Inventors: Louie A. Dickens, Tucson, AZ (US);
Timothy A. Johnson, Tucson, AZ (US);
Craig A. Klein, Tucson, AZ (US);
Gregg S. Lucas, Tucson, AZ (US);
Daniel J. Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1306 days.

(21) Appl. No.: 12/483,443

(22) Filed: Jun. 12, 2009

(65) Prior Publication Data

US 2010/0318820 A1  Dec. 16, 2010

(51) Int. Cl.
| | | |
|---|---|---|
| *G06F 1/00* | (2006.01) |
| *G06F 1/26* | (2006.01) |
| *G06F 1/30* | (2006.01) |
| *G06F 13/00* | (2006.01) |
| *G06F 3/06* | (2006.01) |
| *G06F 1/32* | (2006.01) |

(52) U.S. Cl.
CPC ............ *G06F 3/0625* (2013.01); *G06F 1/3221* (2013.01); *G06F 3/0634* (2013.01); *G06F 3/0688* (2013.01); *G06F 3/0689* (2013.01); Y02B 60/1246 (2013.01)
USPC ............ 713/310; 713/320; 713/323; 711/154

(58) Field of Classification Search
CPC ... G06F 3/0625; G06F 3/0634; G06F 3/0689; G06F 1/3209; G06F 1/3221; Y02B 60/1246
USPC .......... 713/300, 310, 320, 324, 330; 709/219; 365/226, 227
See application file for complete search history.

(56) References Cited

U.S. PATENT DOCUMENTS

| | | | |
|---|---|---|---|
| 6,317,839 B1 | 11/2001 | Wells | |
| 6,657,534 B1 | 12/2003 | Beer et al. | |
| 2008/0104204 A1* | 5/2008 | Moore et al. | 709/219 |
| 2008/0168223 A1* | 7/2008 | Reeves et al. | 711/114 |
| 2008/0259710 A1 | 10/2008 | Wenzel et al. | |
| 2009/0132838 A1* | 5/2009 | Cherian et al. | 713/320 |
| 2010/0115295 A1* | 5/2010 | Diab | 713/300 |

* cited by examiner

*Primary Examiner* — Kim Huynh
*Assistant Examiner* — Brandon Kinsey
(74) *Attorney, Agent, or Firm* — Nelson and Nelson; Daniel P. Nelson; Alexis V. Nelson (57) ABSTRACT

A method for managing power consumed by storage systems and other devices is disclosed herein. In certain embodiments, such a method may include initially monitoring conditions (such as data traffic conditions) on a communication link between a first device and a second device. The method may further include determining whether the conditions on the communication link warrant powering down or powering up the second device. In the event the conditions warrant powering down the second device, a power-down command may be generated and transmitted from the first device to the second device. In the event the conditions warrant powering up the second device, a power-up command may be generated and transmitted from the first device to the second device. In selected embodiments, the power-up and power-down commands are one of SCSI commands and FICON commands. A corresponding apparatus, system, and computer-usable medium are also disclosed and claimed herein.

25 Claims, 7 Drawing Sheets

| Bit/Byte | 7 | 6 | 5 | 4 | 3 | 2 | 1 | 0 |
|---|---|---|---|---|---|---|---|---|
| 0 | OPERATION CODE (7Fh) ||||||||
| 1 | CONTROL (00) ||||||||
| 2 | miscellaneous CDB information (C9) ||||||||
| 3 | miscellaneous CDB information (00) ||||||||
| 4 | miscellaneous CDB information (00) ||||||||
| 5 | miscellaneous CDB information (00) ||||||||
| 6 | miscellaneous CDB information (00) ||||||||
| 7 | Additional CDB Length (3) ||||||||
| 8 | (MSB) Service action (00) ||||||||
| 9 | (LSB) Service action (00 for power down 01 for power up) ||||||||
| 10 | Service action specific fields ||||||||

Fig. 7

STORAGE SYSTEM POWER MANAGEMENT

BACKGROUND

1. Field of the Invention

This invention relates to storage systems, and more particularly to apparatus and methods for reducing the power consumption of storage systems.

2. Background of the Invention

The emergence of the Internet and the growth of business enterprises have resulted in a dramatic increase in server-centric applications. This increase has caused an equally dramatic rise in data-centric services, such as transaction processing systems, web portals, email servers, stock trading and financial transaction systems, search engines, file servers, and the like. No longer just the domain of larger corporations, such data-centric services are becoming more prevalent with smaller business enterprises and institutions. These data-centric services are increasingly important in the global economy as millions (and perhaps even billions) of users rely on these services each day.

One thing that each of the above data-centric services has in common is that each typically relies heavily on storage systems for their data storage and processing requirements. Often, these storage systems are implemented as arrays of disk drives, tape libraries, or other storage devices. These storage systems may, in turn, be connected to networks to form storage-area-networks or network-attached storage. As data-centric services increase, reliance on storage systems of various types also increases.

Unfortunately, as reliance on storage systems continues to increase, the power consumed by storage systems also increases. The increased power consumption can significantly increase running costs, stresses on power supplies, impacts on the environment, and device failure rates. These power costs are eventually passed on to consumers. Another side-effect of high power consumption is heat generation. As power consumption increases, more heat is generated. This heat needs to be removed one way or another, further increasing costs.

In view of the foregoing, what are needed are apparatus and methods to reduce the power consumed by storage systems and other devices. Ideally, such an apparatus and method could turn off (or greatly reduce the power consumed by) a particular storage system when not in use or lightly used, and turn on the storage system when in use. Further needed are apparatus and methods that can utilize existing protocols to reduce power consumption.

SUMMARY

The invention has been developed in response to the present state of the art and, in particular, in response to the problems and needs in the art that have not yet been fully solved by currently available power management apparatus and methods. Accordingly, the invention has been developed to provide apparatus and methods for managing the power consumed by storage systems and other devices. The features and advantages of the invention will become more fully apparent from the following description and appended claims, or may be learned by practice of the invention as set forth hereinafter.

Consistent with the foregoing, a method for managing the power consumed by storage systems and other devices is disclosed herein. In certain embodiments, such a method may include initially monitoring conditions (such as data traffic conditions) on a communication link between a first device and a second device. The method may further include determining whether the conditions on the communication link warrant powering down or powering up the second device. In the event the conditions warrant powering down the second device, a power-down command may be generated and transmitted from the first device to the second device, thereby powering down the second device. In the event the conditions warrant powering up the second device, a power-up command may be generated and transmitted from the first device to the second device, thereby powering up the second device. In selected embodiments, the power-up and power-down commands are one of SCSI commands and FICON commands.

A corresponding apparatus, system, and computer-usable medium are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

As will be appreciated by one skilled in the art, the present invention may be embodied as an apparatus, system, method, or computer-usable medium. Furthermore, the present invention may take the form of a hardware embodiment, a software embodiment (including firmware, resident software, microcode, etc.) configured to operate hardware, or an embodiment combining software and hardware aspects that may all generally be referred to herein as a "module" or "system." Furthermore, the present invention may take the form of a computer-usable medium embodied in any tangible medium of expression having computer-usable program code stored therein.

Any combination of one or more computer-usable or computer-readable medium(s) may be utilized to store the computer program product. The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device. In the context of this document, a computer-usable or computer-readable medium may be any medium that can contain, store, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention may be described below with reference to flowchart illustrations and/or block diagrams of methods, apparatus, systems, and computer-usable mediums according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
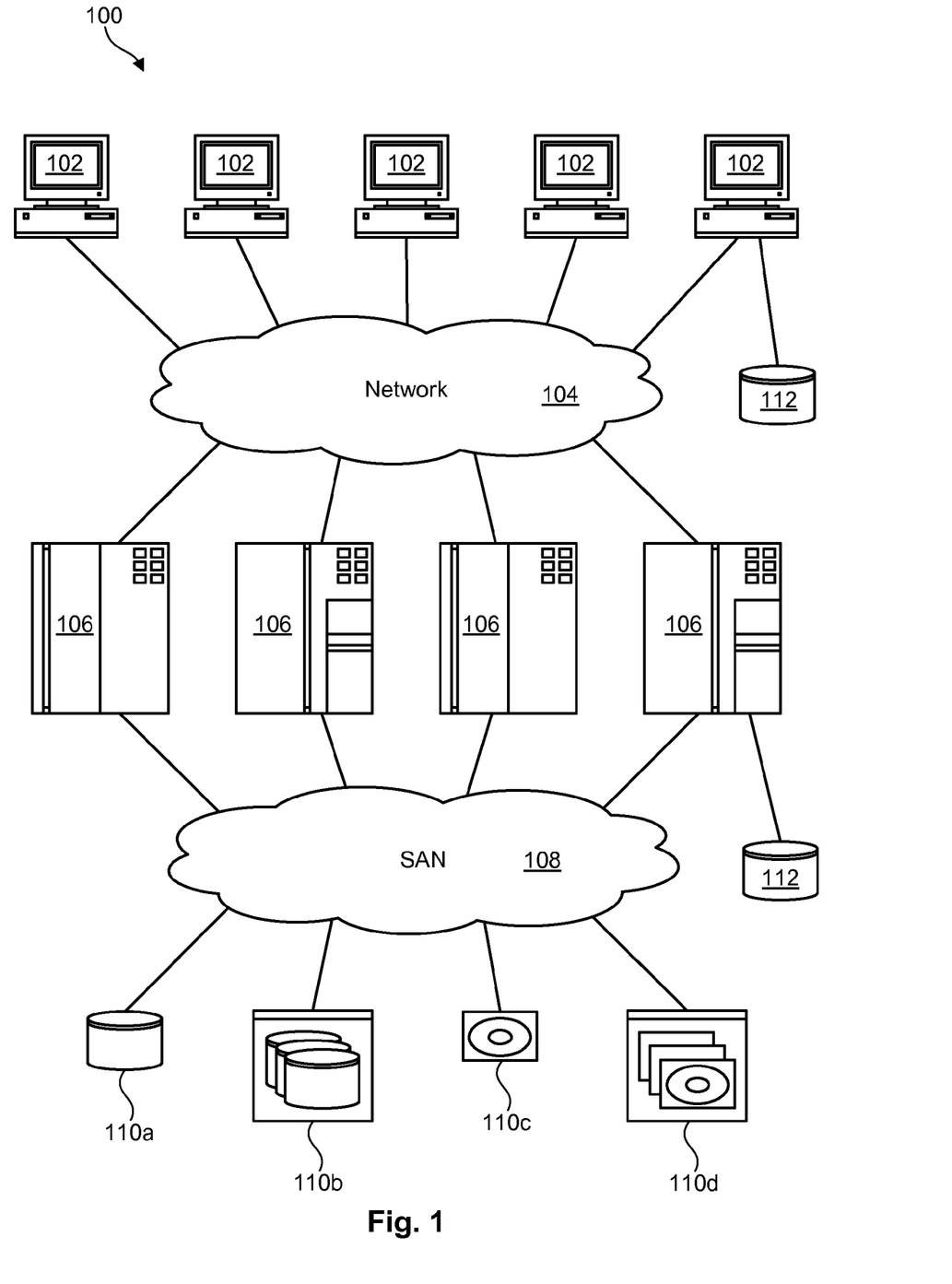
FIG. 1 is a high-level block diagram showing one example of a computer network architecture for implementing an apparatus and method in accordance with the invention.

Referring to FIG. 1, one embodiment of computer-network architecture 100 is illustrated. The architecture 100 is presented to show various possible implementations for a power management module in accordance with the invention. The architecture 100 is presented only by way of example and is not intended to be limiting. Indeed, the power management apparatus and methods disclosed herein may be applicable to a wide variety of different computers, servers, storage systems, and network architectures, in addition to the network architecture 100 shown.

As shown, one embodiment of a computer-network architecture 100 for use with the present invention may include one or more computers 102, 106 interconnected by a network 104. The network 104 may include, for example, a local-area-network (LAN) 104, a wide-area-network (WAN) 104, the Internet 104, a Fibre Channel network 104, or the like. In certain embodiments, the computers 102, 106 may include both client computers 102 and server computers 106. In general, client computers 102 may initiate communication sessions, whereas server computers 106 may wait for requests from the client computers 102. In certain embodiments, direct-attached storage systems 112 (e.g., hard disk drives, solid state drives, etc.) may be connected directly to the computers 102 and/or servers 106. The computers 102 and servers 106 may communicate with the direct-attached storage devices 112 using protocols such as ATA, SATA, SCSI, SAS, or Fibre Channel.

The computer-network architecture 100 may, in certain embodiments, include a storage network 108 behind the servers 106, such as a storage-area-network (SAN) 108 or a LAN 108 (e.g., when using network attached storage). This network 108 may connect the servers 106 to one or more storage systems 110, such as individual hard disk drives 110a or solid state drives 110a, arrays 110b of hard disk drives or solid state drives, tape drives 110c, tape libraries 110d, CD-ROM libraries, or the like. Where the network 108 is a SAN, the servers 106 and storage systems 110 may communicate using a networking standard such as Fibre Channel (FC). In certain embodiments, the Fibre Channel network 108 may use a transport protocol, such as Fibre Channel Protocol (FCP), to transport SCSI commands over the network 108. These SCSI commands may flow from initiators (such as servers 106) to targets (such as storage systems 110).

Figure 2:
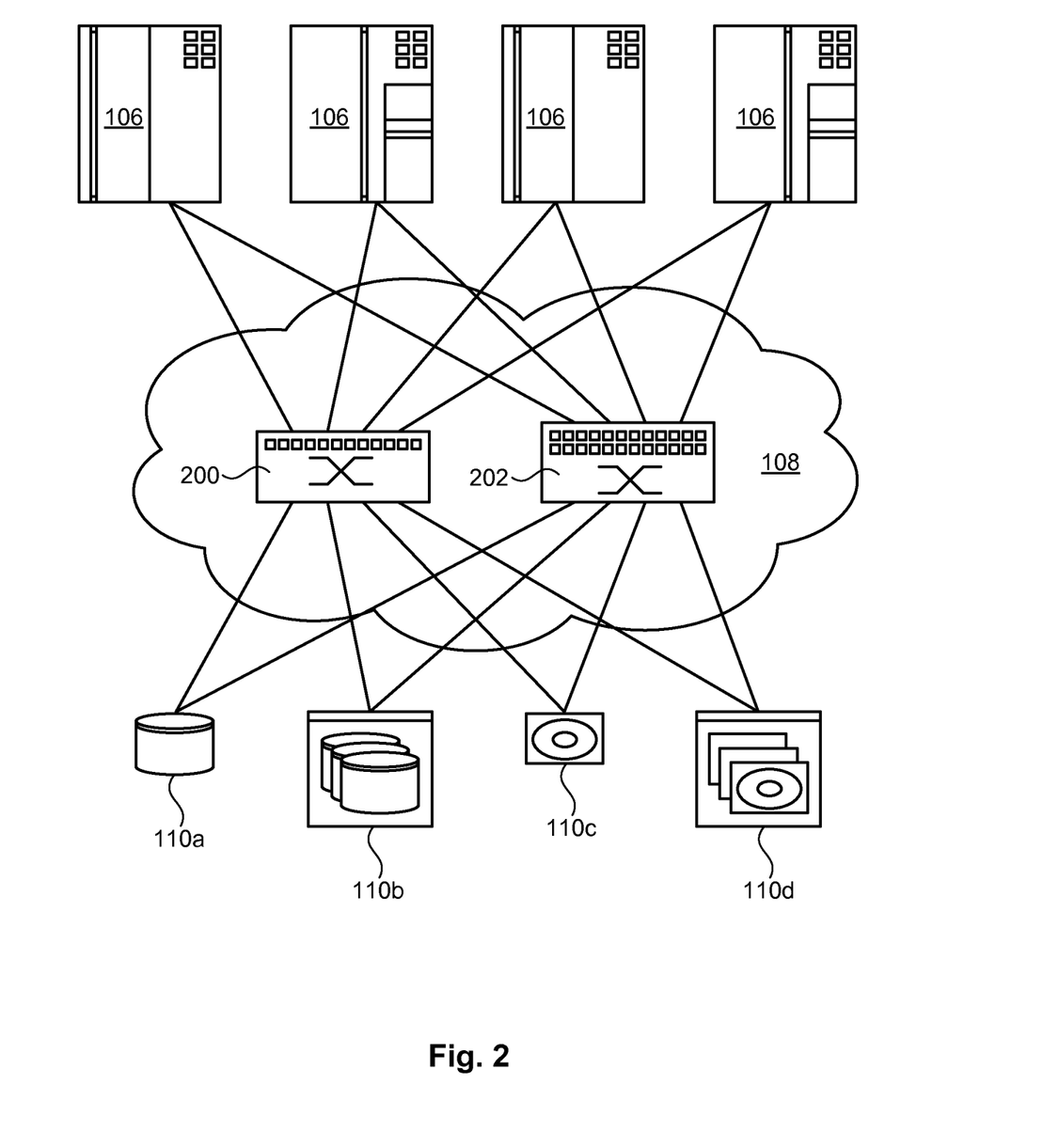
FIG. 2 is a high-level block diagram showing one example of a storage-area-network where an apparatus and method in accordance with the invention may be implemented.

Referring to FIG. 2, in selected embodiments, a storage-area-network 108 may provide connectivity between the servers 106 and the storage systems 110 using one or more interconnect components, such as switches, directors, hubs, gateways, bridges, routers, or the like. These interconnect components may create a fabric between the servers 106 and the storage systems 110. As shown in FIG. 2, a switch 200 and a director 202 may be used to provide a switched fabric between the servers 106 and the storage systems 110. As will be explained in more detail hereafter, a power management module in accordance with the invention may, in certain embodiments, be implemented within the interconnect components, such as within the switch 200 and director 202.

Figure 3:
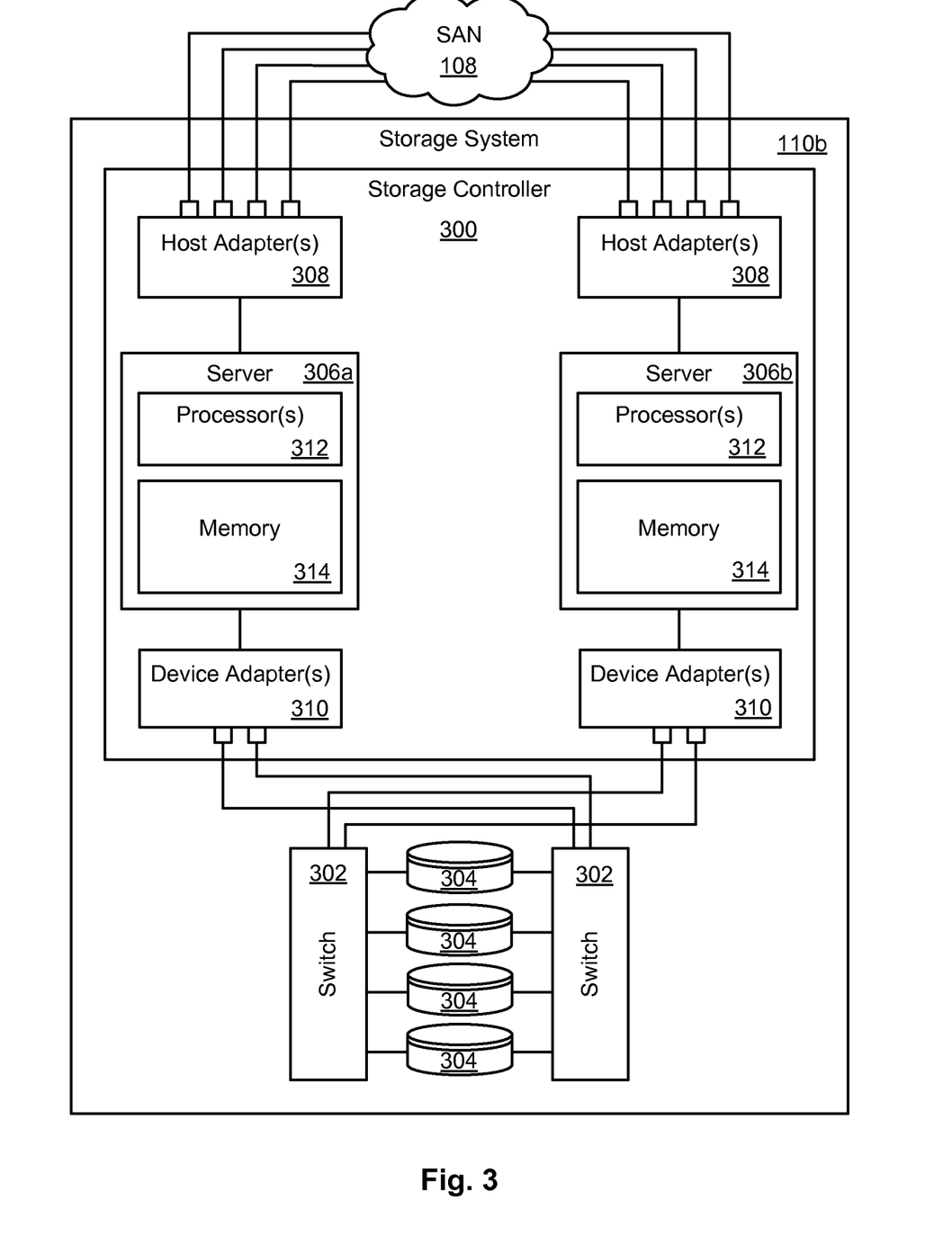
FIG. 3 is a high-level block diagram showing one example of a storage system where an apparatus and method in accordance with the invention may be implemented.

FIG. 3 shows one embodiment of a storage system 110b containing an array of hard-disk drives and/or solid-state drives. The internal components of the storage system 110b are shown since a power management module may, in certain embodiments, be implemented within the storage system 110b. As shown, the storage system 110b includes a storage controller 300, one or more switches 302, and one or more storage devices 304, such as hard disk drives 304 or solid state drives 304. The storage controller 300 may enable one or more hosts (e.g., open system and/or mainframe servers 106) to access data in one or more storage devices 304.

In selected embodiments, the storage controller 300 includes one or more servers 306. The storage controller 300 may also include host adapters 308 and device adapters 310 to connect to host devices and storage devices 304, respectively. Multiple servers 306a, 306b may provide redundancy to ensure that data is always available to connected hosts. Thus, when one server 306a fails, the other server 306b may remain functional to ensure that I/O is able to continue between the hosts and the storage devices 304. This process may be referred to as a "failover."

One example of a storage controller 300 having an architecture similar to that illustrated in FIG. 3 is the IBM DS8000™ enterprise storage system. The DS8000™ is a high-performance, high-capacity storage controller providing disk storage that is designed to support continuous operations. DS8000™ series models use IBM's POWER5™ servers 306, which are integrated with IBM's virtualization engine technology. The virtualization engine provides a partitioning capability that allows the server's resources and storage resources to be divided up to do different tasks.

Nevertheless, embodiments of the invention are not limited to being implemented in the IBM DS8000™ enterprise storage controller, but may be implemented in any comparable or analogous storage system, regardless of the manufacturer, product name, or components or component names associated with the system. Furthermore, any system that could benefit from one or more embodiments of the invention is deemed to fall within the scope of the invention. Thus, the IBM DS8000™ is presented only by way of example and is not intended to be limiting.

In selected embodiments, each server 306 may include one or more processors 312 (e.g., n-way symmetric multiprocessors) and memory 314. The memory 314 may include volatile memory (e.g., RAM) as well as non-volatile memory (e.g., ROM, EPROM, EEPROM, hard disks, flash memory, etc.). The volatile memory 314 and non-volatile memory 314 may store software modules that run on the processor(s) 312 and are used to access data in the storage devices 304. The servers 306 may host at least one instance of these software modules, which collectively may also be referred to as a "server," albeit in software form. These software modules may manage all read and write requests to logical volumes in the storage devices 304.

Figure 4:
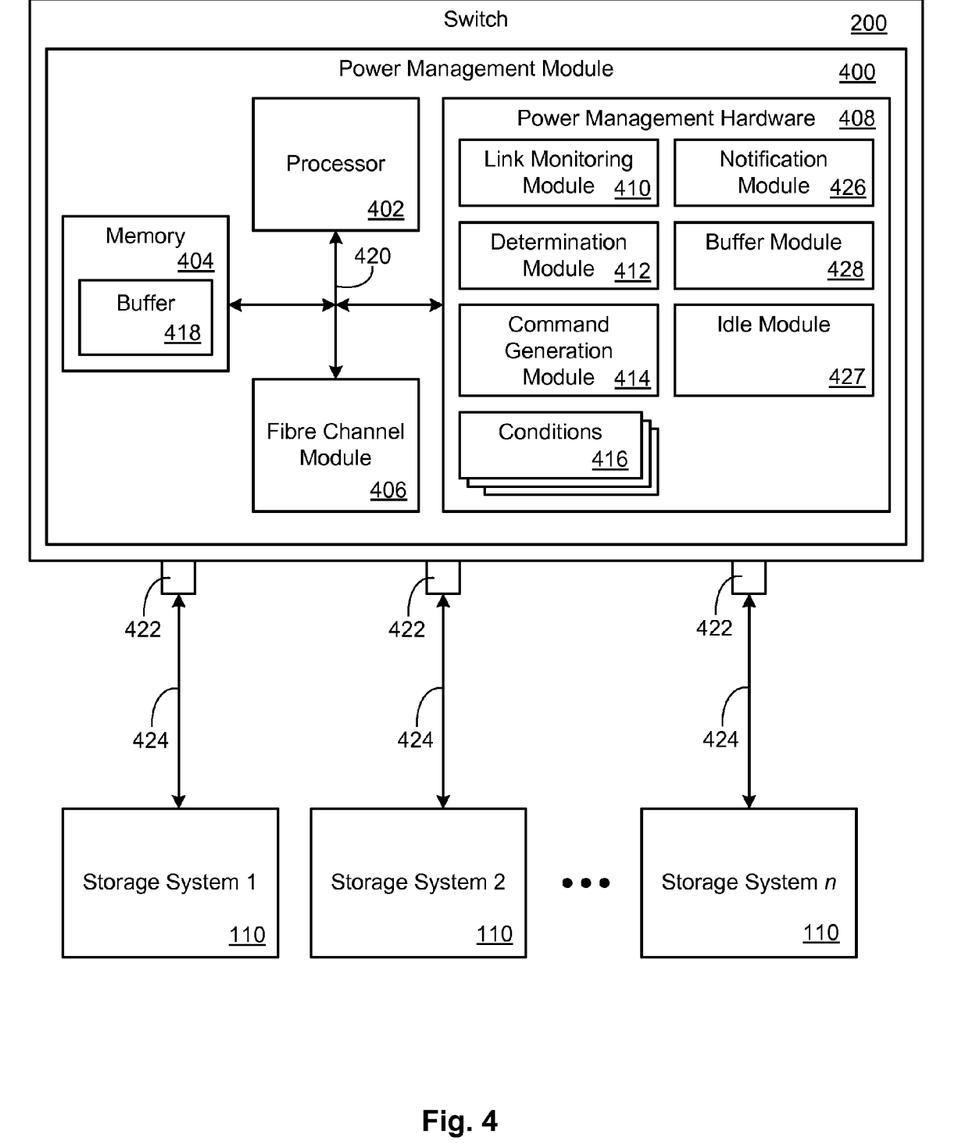
FIG. 4 is a high-level block diagram showing one example of a power management module embodied within a switch, wherein much of the functionality of the power management module is implemented in hardware.

FIG. 4 shows one embodiment of a power management module 400, integrated into an interconnect component, such as a switch 200. As shown, the switch 200 may include one or more ports 422 to connect to one or more storage systems 110. The power management module 400 is configured to manage the power consumed by each of the storage systems 110. In this embodiment, the power management module 400 includes a processor 402, a memory 404, a fibre channel module 406, and power management hardware 408. Each of these components 402, 404, 406, 408 may communicate over a system bus 420. The power management module 400 may have its own dedicated processor 402, memory 404, and fibre channel module 406, or may share these resources with other functions of the switch 200. Whether the power management module 400 has its own dedicated hardware or shares hardware with other functions is a design choice that may depend on resources required by the power management module 400 and other switch functions, as well as the resources that are available on the processor 402, memory 404, and fibre channel module 406.

The fibre channel module 406 may be configured to keep the link 424 between the switch 200 and each storage system 110 alive and contain functionality to send and receive frames. Thus, the fibre channel module 406 may include functionality to send and receive traffic over the links 424. The fibre channel module 406 may include one or more fibre channel chipsets know to those in the art, although other hardware, software, or combinations of hardware and software may also be used. The processor 402 may control the operation of the power management module 400 by executing machine readable-code stored in the memory 404. The memory 404 may include flash memory, a hard disk, optical storage, solid-state memory, or any other type of memory or combination of memories know to those of skill in the art.

The power management hardware 408 (which may be embodied as an ASIC, FPGA, PAL, discrete components, or other suitable hardware components, and optionally firmware or software to program the hardware components) may include functionality to monitor each link 424 and power the storage systems 110 up or down based on conditions that are detected on the links 424. In selected embodiments, the power management hardware 408 includes one or more of a link monitoring module 410, a determination module 412, a command generation module 414, a notification module 426, a buffer module 428, and an idle module 427. The power management hardware 408 may also store data associated with one or more conditions 416. These conditions 416 may determine whether a storage system 110 should be powered up or powered down. The conditions 416 may identify traffic patterns, traffic frequency, or other events or conditions on a link 424 that would warrant powering a storage system 110 up or down.

The link monitoring module 410 may include functionality to monitor each of the links 424, and more specifically monitor conditions (e.g., data traffic) on each of the links 424. A determination module 412 may determine whether the conditions on the link 424 warrant powering up or powering down the storage system 110 connected to the link 424. When making this determination, the determination module 412 may, in certain embodiments, determine the current state of the storage system 110 (i.e., whether the storage system 100 is currently powered up or down) to determine what action to take. If the storage system 110 is powered down and conditions on the link 424 warrant powering up the storage system 110, the command generation module 414 may generate a power-up command configured to power up the storage system 110. Conversely, if the storage system 110 is powered up and conditions on the link 424 warrant powering down the storage system 110, the command generation module 414 may generate a power-down command configured to power down the storage system 110.

Upon determining the appropriate action, the switch 200 (i.e., the initiator) may transmit the command to the appropriate storage system 110 (i.e., the target). The storage system 110 may then execute the command by powering itself up or down as directed by the command. While a storage system 100 is powered down or is in the process of powering up (not yet fully powered up), a notification module 426 may return busy status to all requests (from servers 106 or other devices) attempting to access the storage system 100. An idle module 427 may idle to keep the link to the initiator alive.

In order for a storage system 110 to power itself up or down, the storage system 110 may be configured to recognize the power up/down commands and act accordingly. In certain cases, this may be accomplished by modifying the firmware or other internal programming of the storage system 110. Some storage systems 110 may require additional functionality in their internal hardware to recognize and execute such commands. Furthermore, in order for a storage system 110 to power itself up after it has been powered down, some part of the storage system circuitry may be configured to stay awake to detect and execute power up commands. For example, if the storage system 110 is a hard-disk drive, the motor (to spin the platters), the read/write mechanism, and selected control hardware may be powered down, while a small portion of the electronics may be kept awake to detect and execute power-up commands (and possibly return a busy status signal while the device is powered down or is in the process of powering up). Once powered up, the drive can operate in the conventional manner. This will greatly reduce the power consumed by the storage system 110 when it is powered down, while still allowing it to receive and recognize power up commands.

Because repeatedly powering up and powering down a storage system 110 may be time-intensive and potentially increase failure rates in the storage system 110, apparatus and methods may be provided to limit the rate and/or frequency the storage system 110 is powered up or down. For example, minimal or intermittent amounts of traffic, such as inquiries to gather information about the storage system 110 or accesses to small amounts of data, may not warrant powering up a storage system 110. Such traffic may constitute a temporary spike in data traffic on the link 424, as opposed to significant and meaningful traffic. In certain cases, the transmission of one or more frames on the link 424 may indicate that significant traffic is occurring on the link 424 and justify powering up the storage system 110. Conditions 416 programmed or hard-coded into the power management module 400 may contain information to identify traffic that is considered significant traffic as opposed to minimal or intermittent traffic that would not justify powering up a storage system 110.

Nevertheless, minimal or intermittent traffic patterns or events will likely need to be addressed and not ignored. In selected embodiments, a buffer module 428 may be used to temporarily store data or commands that are not urgent or important enough to warrant immediately powering up a storage system 110, but rather can be handled at a later time. This buffer module 428 may, in certain embodiments, store the data or commands in a buffer 418 until they can be handled. The next time the storage system 110 is powered up, these commands or data may be transmitted from the buffer 418 to the storage system 110 and handled in the conventional manner. In this way, minimal or intermittent traffic may, in certain embodiments, be queued or buffered until it can be handled in an appropriate manner.

Figure 7:
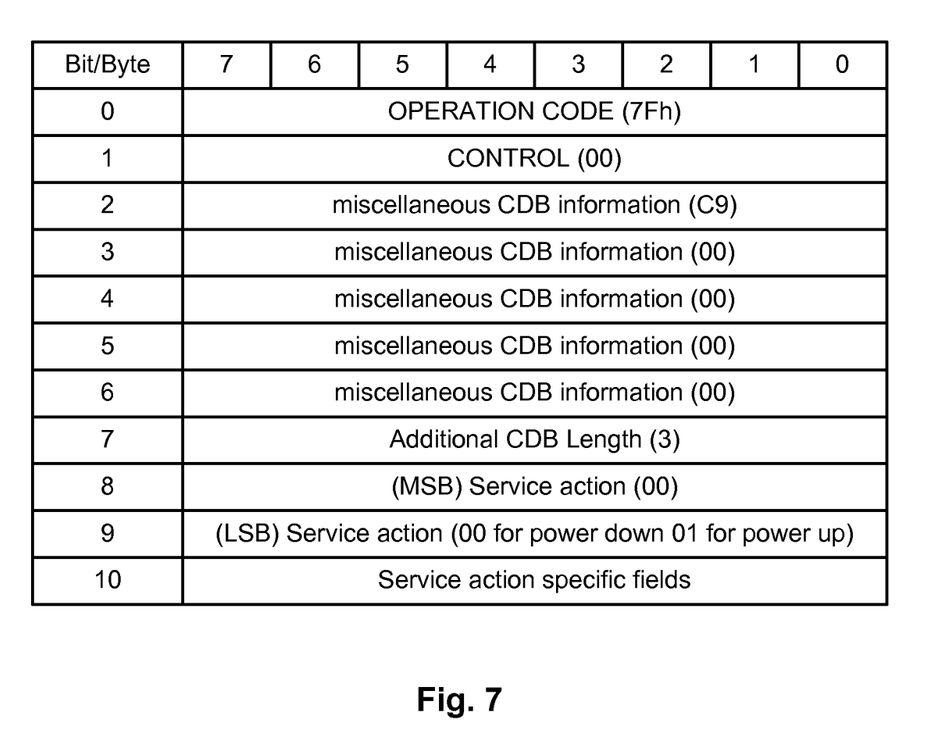
FIG. 7 is a block diagram showing one example of a command for powering up or powering down a storage system.

In certain embodiments, the power up and/or power down commands are implemented as SCSI commands. Since there are currently no SCSI commands to power up and/or power down devices, a power-control command may, in certain embodiments, be built using the variable-length Command Descriptor Block (CDB) described in the SCSI Primary Commands standard. The CDB includes a one-byte operation code followed by command-specific parameters. The structure of a variable-length CDB is shown in FIG. 7. Using the variable-length CDB allows the power control technique to comply with SCSI standards. However, other non-standard SCSI commands may also be used to implement the power-control commands. At some point, a SCSI standards committee may decide to develop a specific SCSI power up/down command to address power management in connected devices.

Figure 5:
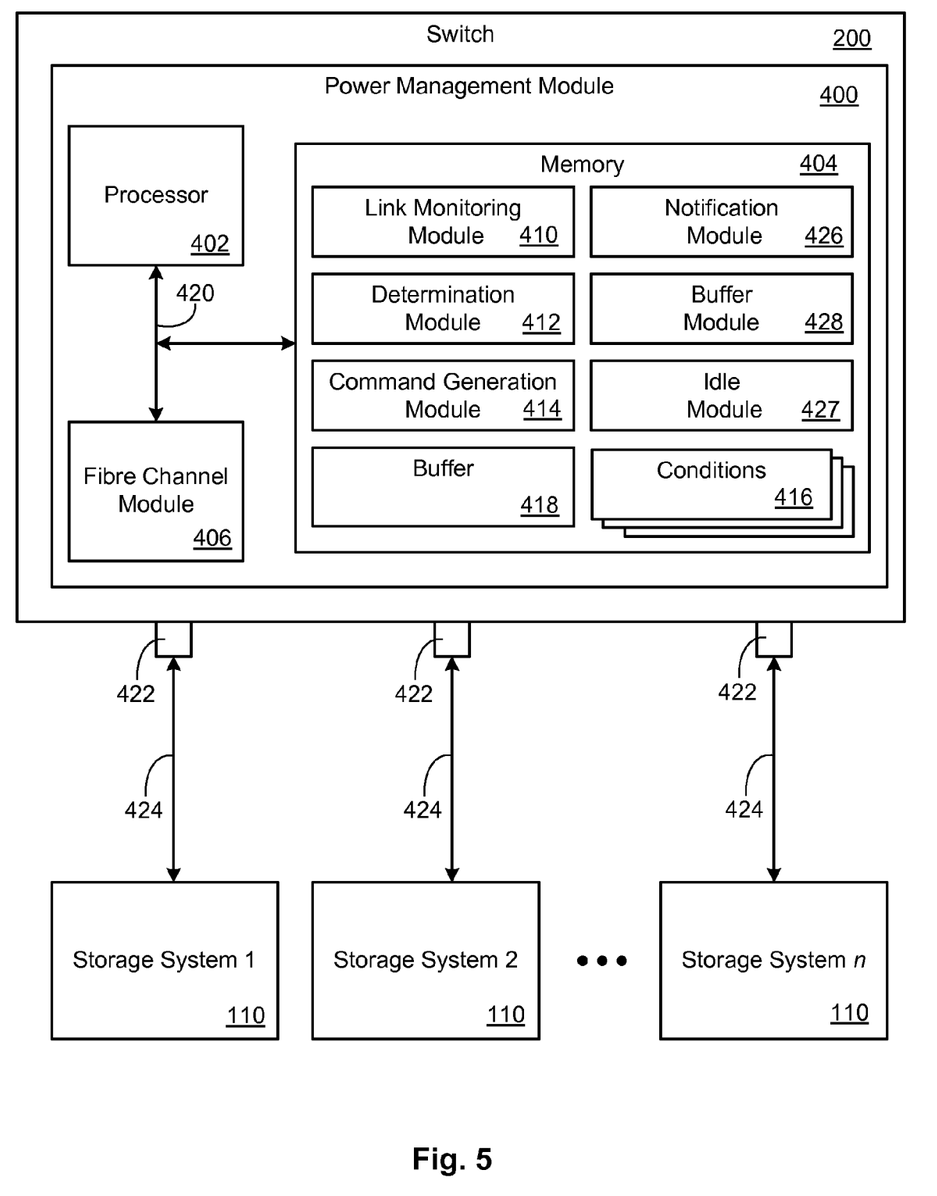
FIG. 5 is a high-level block diagram showing another example of a power management module, wherein much of the functionality of the power management module is implemented in software or firmware.

FIG. 5 shows another embodiment of a power management module 400. In this embodiment, the link monitoring module 410, determination module 412, command generation module 414, notification module 426, buffer module 428, and idle module 427 are implemented primarily in software or firmware as opposed to hardware. The feasibility of such an implementation may depend on the power of the processor 402 and other resources and whether they can handle the additional workload. The feasibility of such an implementation may also depend on whether the latency typically associated with a software implementation is acceptable.

As shown, the power management modules 400 of FIGS. 4 and 5 are implemented in a switch 200. One advantage of implementing the power management module 400 in a switch 200 (as opposed to inside the storage system 110) is that a single device may be used to control the power consumed by many storage systems 110. This is also true for power management modules 400 incorporated into devices such as directors 202, hubs, routers, or the like. Nevertheless, the power management module 400 is not limited to being implemented in these types of devices. In certain embodiments, the power management module 400 may also be implemented in servers 106 or computers 102. For example, a power management module 400 incorporated into a server 106 or computer 102 may control the power consumed by one or more direct-attached storage systems 112 by issuing SCSI power up or power down commands to these systems 112.

In selected embodiments, a power management module 400 in accordance with the invention may be implemented within a storage system 110, such as within the IBM DS8000™ enterprise storage system or similar products. For example, referring to FIG. 3, in certain embodiments, a power management module 400 may be incorporated into the internal switches 302 of the storage system 110b to issue SCSI commands to the internal storage devices 304, thereby controlling power consumption. This may occur internally in a way that is transparent to devices outside the storage system 110b. Thus, in certain embodiments, the power management module 400 may be incorporated into storage systems 110, particularly where the storage systems 110 contain internal switches 302 or other interconnect components. In general, embodiments of the invention may encompass any SCSI initiator configured to send power management commands to any SCSI target.

Figure 6:
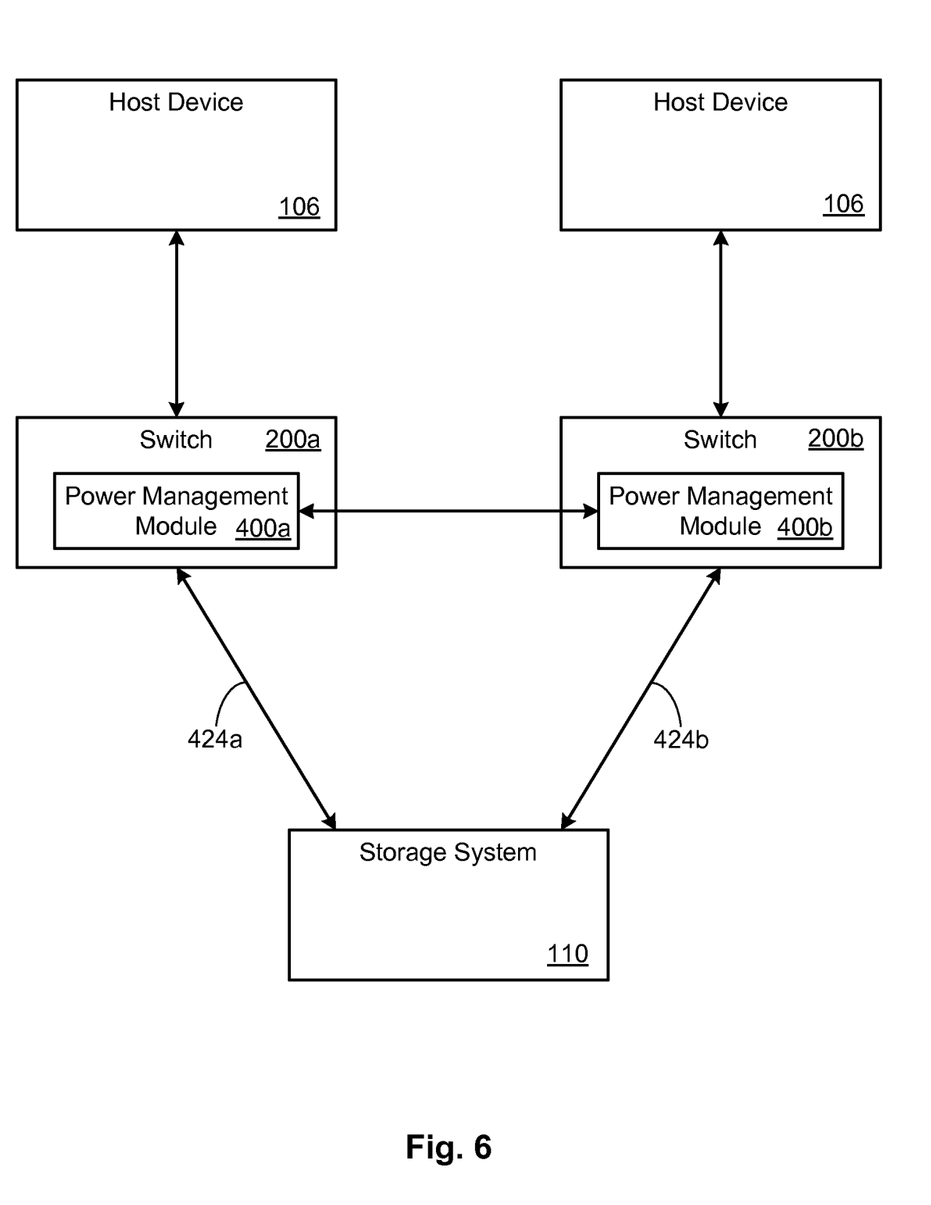
FIG. 6 is a high-level block diagram showing multiple switches, each with its own power management module, communicating with the same storage system.

Referring to FIG. 6, in certain cases, a storage system 110 may communicate with multiple external devices over multiple links 424a, 424b. The illustrated example shows a pair of switches 200a, 200b, each having its own power management module 400a, 400b communicating with the storage system 110. In such a scenario, one or both of the power management modules 400a, 400b should be aware of traffic on both links 424a, 424b before powering up or powering down the storage system 110. In other words, mechanisms are needed to ensure that one of the switches 200a, 200b is not powering down the storage system 110 while the other switch 200a, 200b is transmitting data to the storage system 110. To address this scenario, in certain embodiments, the power management modules 400a, 400b may be configured to communicate with one another to ensure that each is aware of conditions on both links 424a, 424b. Alternatively, one of the power management modules 400a, 400b may be configured to monitor conditions on both of the links 424a, 424b and issue power management commands to the storage system 110.

It should be noted that although particular reference has been made herein to transmitting SCSI commands over Fibre Channel, the claimed apparatus and methods are not limited to this protocol. Indeed, the disclosed apparatus and methods may also be applied to protocols such as iSCSI, Seral Attached SCSI (SAS), Fibre Channel Protocol SCSI (FCP-SCSI), and Fibre Channel over Ethernet (FCoE), to name just a few. Thus, nothing in this disclosure should limit the disclosed apparatus and methods to simply transmitting SCSI commands over Fibre Channel networks.

The flowcharts and block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for managing storage-system power consumption, the method comprising:
   monitoring, by a first device, conditions on a first communication link between the first device and a second device;
   receiving, by the first device, information about conditions on a second communication link between the second device and a third device;
   determining, by the first device, whether the conditions on both the first communication link and the second communication link together warrant one of powering down and powering up the second device;
   generating, by the first device, a power-down command and transmitting the power-down command from the first device to the second device in the event the conditions warrant powering down the second device;
   returning, by the first device in response to requests received to access the second device while the second device is powered down, a status indicator indicating that the second device is one of busy and unavailable; and
   generating, by the first device, a power-up command and transmitting the power-up command from the first device to the second device in the event the conditions warrant powering up the second device.

2. The method of claim 1, wherein at least one of the first communication link and the second communication link is a Fibre Channel communication link.

3. The method of claim 1, wherein the first device is one of a switch, a director, a router, a bridge, a gateway, and a hub.

4. The method of claim 1, wherein the second device is a storage system.

5. The method of claim 1, wherein the power-down command and the power-up command are one of SCSI commands and FICON commands.

6. The method of claim 1, wherein the conditions correspond to data traffic conditions on the first and second communication links.

7. The method of claim 1, further comprising buffering data traffic in the first device to delay powering up the second device.

8. An apparatus for managing storage-system power consumption, the apparatus comprising:
   a first link monitoring module to monitor conditions on a first communication link between a first device and a second device;
   a second link monitoring module to monitor conditions on a second communication link between the second device and a third device
   a determination module to determine whether the conditions on both the first communication link and the second communication link together warrant one of powering down and powering up the second device;
   a command generation module to generate a power-down command to be transmitted from the first device to the second device in the event the conditions warrant powering down the second device;
   a notification module to return, in response to requests received to access the second device when the second device is powered down, a status indicator indicating that the second device is one of busy and unavailable; and
   the command generation module further configured to generate a power-up command to be transmitted from the first device to the second device in the event the conditions warrant powering up the second device.

9. The apparatus of claim 8, wherein at least one of the first communication link and the second communication link is a Fibre Channel communication link.

10. The apparatus of claim 8, wherein the first device is one of a switch, a director, a router, a bridge, a gateway, and a hub.

11. The apparatus of claim 8, wherein the second device is a storage device.

12. The apparatus of claim 8, wherein the power-down command and the power-up command are one of SCSI commands and FICON commands.

13. The apparatus of claim 8, wherein the conditions correspond to data traffic conditions on the first and second communication links.

14. The apparatus of claim 8, further comprising a buffer to store data traffic to delay powering up the second device.

15. A non-transitory computer-readable storage medium having computer-usable program code stored therein, the computer-usable program code comprising:
   computer-usable program code to monitor conditions on a first communication link between a first device and a second device;
   computer-usable program code to monitor conditions on a second communication link between the second device and a third device;
   computer-usable program code to determine whether the conditions on both the first communication link and the second communication link together warrant one of powering down and powering up the second device;
   computer-usable program code to generate a power-down command and transmit the power-down command from the first device to the second device in the event the conditions warrant powering down the second device;
   computer-usable program code to return, in response to requests received to access the second device when the second device is powered down, a status indicator indicating that the second device is one of busy and unavailable; and
   computer-usable program code to generate a power-up command and transmit the power-up command from the first device to the second device in the event the conditions warrant powering up the second device.

16. The non-transitory computer-readable storage medium of claim 15, wherein at least one of the first communication link and the second communication link is a Fibre Channel communication link.

17. The non-transitory computer-readable storage medium of claim 15, wherein the first device is one of a switch, a director, a router, a bridge, a gateway, and a hub.

18. The non-transitory computer-readable storage medium of claim 15, wherein the second device is a storage device.

19. The non-transitory computer-readable storage medium of claim 15, wherein the power-down command and power-up command are one of SCSI commands and FICON commands.

20. The non-transitory computer-readable storage medium of claim 15, wherein the conditions correspond to data traffic conditions on the first and second communication links.

21. The non-transitory computer-readable storage medium of claim 15, further comprising computer-usable program code to buffer data traffic in the first device to delay powering up the second device.

22. A system to manage storage-system power consumption, the system comprising:
   a first device configured to monitor conditions on a first communication link between the first device and a second device;
   a third device configured to monitor conditions on a second communication link between the third device and the second device;
   the first device configured to receive information about the conditions on the second communication link;
   the first device further configured to determine whether the conditions on both the first communication link and the second communication link together warrant one of powering down and powering up the second device;
   the first device further configured to generate a power-down command and transmit the power-down command to the second device in the event the conditions warrant powering down the second device;
   the first device further configured to return, in response to requests received to access the second device when the second device is powered down, a status indicator indicating that the second device is one of busy and unavailable;
   the first device further configured to generate a power-up command and transmit the power-up command to the second device in the event the conditions warrant powering up the second device; and
   the second device configured to receive and execute the power-down command and the power-up command.

23. The system of claim 22, wherein at least one of the first communication link and the second communication link is a Fibre Channel communication link.

24. The system of claim 22, wherein the power-down command and power-up command are one of SCSI commands and FICON commands.

25. The system of claim 22, wherein the conditions correspond to data traffic conditions on the first and second communication links.

* * * * *